April 16, 1940.                W. W. CANNON ET AL                2,197,143
                          BEVERAGE DISPENSING APPARATUS
                              Filed Dec. 27, 1938          2 Sheets-Sheet 1
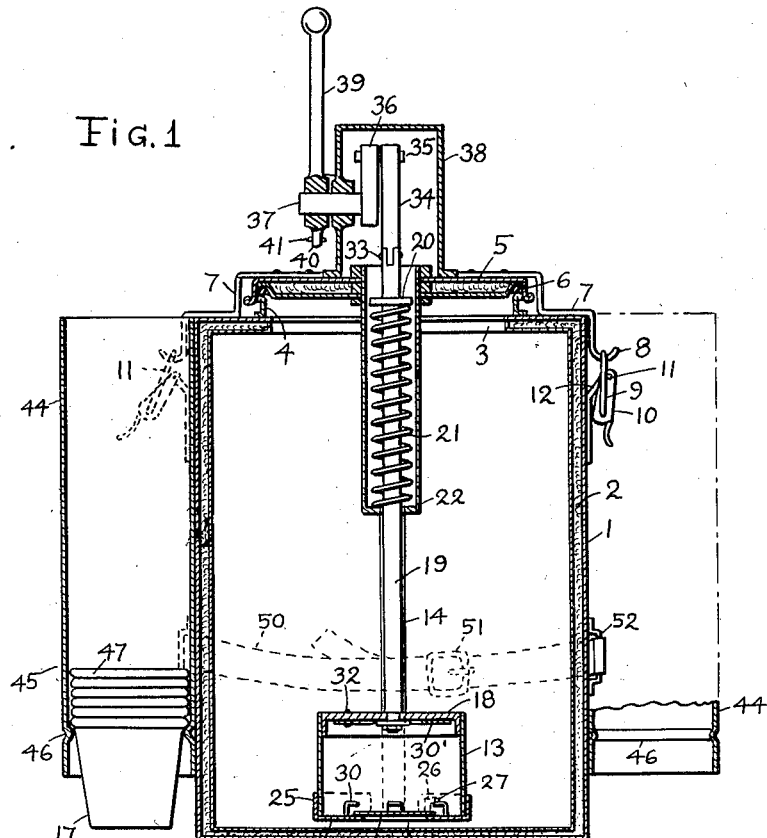
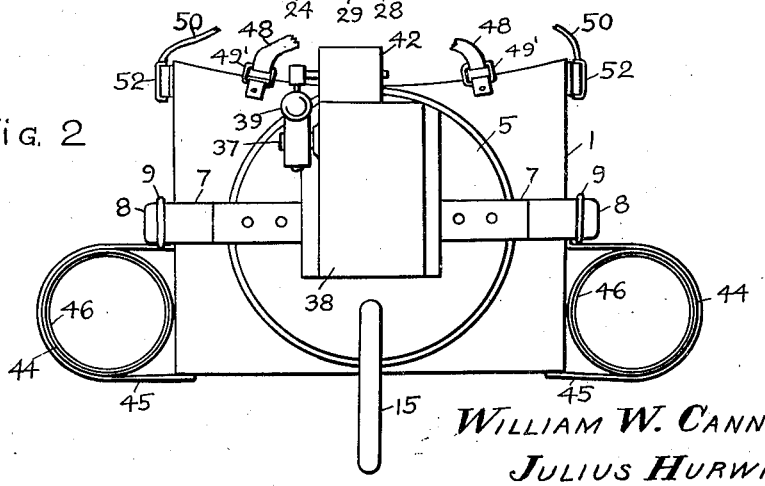
WILLIAM W. CANNON
JULIUS HURWITZ
INVENTORS
BY John P. Wisonow
ATTORNEY.

April 16, 1940.   W. W. CANNON ET AL   2,197,143
BEVERAGE DISPENSING APPARATUS
Filed Dec. 27, 1938   2 Sheets-Sheet 2
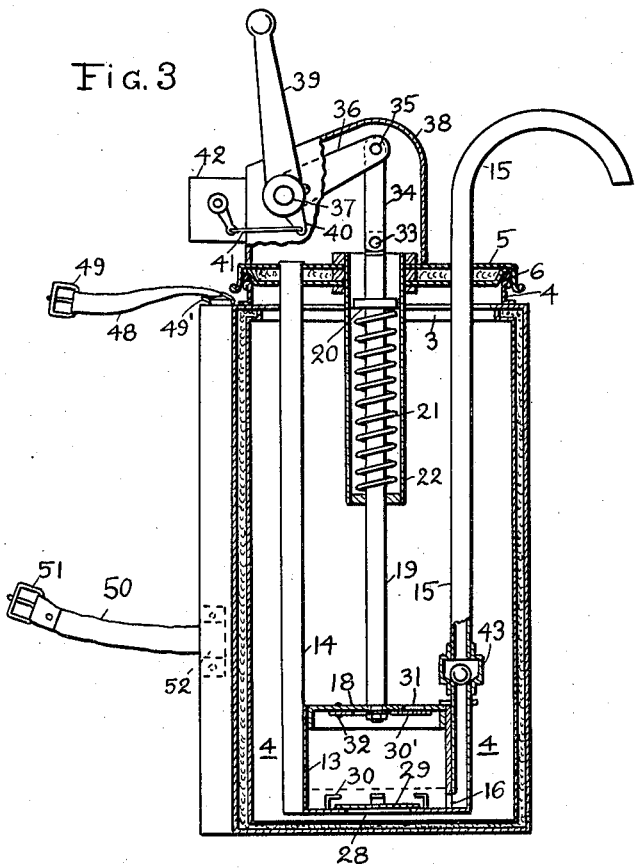
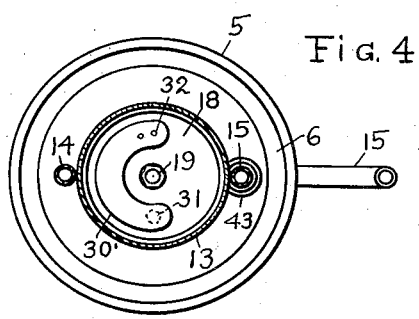
WILLIAM W. CANNON
JULIUS HURWITZ
INVENTORS
BY John P. Mironow
ATTORNEY.

Patented Apr. 16, 1940

2,197,143

UNITED STATES PATENT OFFICE 2,197,143

BEVERAGE DISPENSING APPARATUS

William W. Cannon and Julius Hurwitz, New York, N. Y., assignors, by mesne assignments, to S. R. Sperans, New York, N. Y.

Application December 27, 1938, Serial No. 247,732

4 Claims. (Cl. 225—31)

Our invention relates to beverage dispensing apparatus and has particular reference to apparatus for dispensing beverages and other liquids in measured quantities.

Our invention has for its object to provide a beverage dispensing apparatus which can be easily and simply operated so as to deliver a definite quantity of a liquid with a single movement of a handle at the apparatus. For this purpose we provide the apparatus with a hand operated pump having a metering container in a larger vessel with a discharge pipe extending to the outside, the pump having valves so arranged that one complete stroke of the pump delivers a measured quantity of the liquid through the pipe. We also provide a check valve in the discharge pipe for preventing the return flow of the liquid and maintaining the discharge pipe filled.

Another object of our invention is to provide the pump assembly of the apparatus completely mounted on the cover of the vessel so that the whole assembly can be removed with the cover thereby facilitating cleaning of the vessel and of the pump mechanism.

Another object of our invention is to provide an operating mechanism for the pump composed fully of levers and links without any gears thereby simplifying the construction and facilitating its cleaning and maintenance.

Still another object of our invention is to provide a beverage dispensing apparatus which can be conveniently supported on the operator's body by means of suitable belt straps, the vessel being concave at the rear so that it can fit the operator's chest.

Our invention is more fully described in the accompanying specification and drawings in which—

Fig. 1 is a sectional elevation of our apparatus;

Fig. 2 is a top plan view of the same;

Fig. 3 is a sectional side view of the same;

Fig. 4 is a sectional bottom plan view of the cover and pump plunger taken on the line 4—4 of Fig. 3.

Our beverage dispensing apparatus in its preferred embodiment consists of a vessel 1 having double walls with a space between them filled with a heat insulating material 2 such as rock wool, asbestos, etc. The vessel has an opening 3 on top with a short neck 4 for a cover 5. The latter has a rubber gasket 6 for providing a tight seal between the cover and the neck. The cover has extensions 7 fitting over the sides of the vessel and having hooks 8 at the ends which can be engaged by clamping rings 9. The latter are supported on latches 10 pivoted at 11 on brackets 12 fastened to the sides of the vessel. By pulling the latches outward as shown in dotted lines at the left in Fig. 1, the rings 9 can be released from the hooks 8 for removing the cover.

A measuring container 13 is supported on the cover by means of pipes 14 and 15 closed at the bottom, the pipe 14 having a side opening 16 in communication with the bottom of the vessel. The upper portion of the pipe 15 extends above the cover 5 and is curved in the form of a spout for discharging the liquid from the container into receptacles such as paper cups 17. The capacity of the container is made to correspond to the capacity of the cups 17. A plunger 18 slides in the container and has a rod 19 extending to the top of the cover 5 where it has a collar 20 retaining a spring 21 whose lower end rests against the bottom plate of a tube 22 depending from the cover 5. The spring therefore tends to raise the plunger, a stop plate 23 being provided on the pipe 15 for limiting the upward movement of the plunger. The container 13 represents a tube open at the top and closed at the bottom by a cover 24 with a flange 25 cut away to clear the pipes 14 and 15 and having angular slots 26 engaging pins 27 in the container.

The cover 24 can be removed by turning it sidewise until the pins 27 enter the straight portions of the slots so that the cover can be pulled off. The container can then be washed and cleaned. The cover 24 has an opening 28 closed by a flat plate 29 serving as a valve. Hooks 30 attached to the cover 24 limit the upward movement of the valve plate 29. A supplementary valve is provided in the plunger 18 in the form of a flat spring 30' closing an opening 31 in the plunger at one end, the other end of the spring being attached to the plunger as by rivets 32.

The upper end of the rod 19 is pivotally connected at 33 to one end of a link 34 whose other end is pivotally connected at 35 to the upper end of a lever arm 36 fitted on a shaft 37. The latter is journaled in the wall of a casing 38 supported on top of the cover 5. A handle 39 is attached to the outer end of the shaft 37 and has a lug 40 connected by a link 41 with a counter 42 for counting the number of strokes of the plunger 18.

By turning the handle 39 down, the plunger 18 is made to move downward, expelling the liquid from the container through the discharge pipe 15. The container and plunger represent a pump for discharging the liquid. Upon release of the handle, the spring 21 raises the plunger, drawing the liquid into the container from the vessel through the valves 29 and 30. The latter valve also helps to let the air escape from the container. The pipe 15 has a check valve 43 for preventing the liquid in the pipe from flowing back into the container so that the pipe always remains filled. The liquid therefore flows from the spout of the pipe 15 without any delay as soon as the handle 39 is turned. Tubular holders 44 are attached to the sides of the vessel 1 by straps 45 for paper cups 17 which are frictionally retained by beads 46 abutting the rolled edges 47 of the cups.

The rear side of the vessel 1 is made cylindrically concave so that it can be placed against the operator's chest. The vessel can be supported on the operator's neck by belt straps 48 with a buckle 49, the straps being attached to rings 49' at the top of the vessel. Similar straps 50 with a buckle 51 serve to fasten the vessel to the body of the operator, these straps extending from clips 52 at the sides of the vessel.

Our dispensing apparatus has an important advantage in that it can be easily and quickly taken apart for cleaning and sterilizing; the cover 5 can be easily removed by unlatching the rings 9, the pump comprising the container and plunger being removed with the cover. The plunger can be removed by turning aside the stop plate so that the plunger and the inside of the container can be washed and cleaned. The container can be further taken apart by removing its bottom cover 24. The apparatus has also an advantage in that it is portable and can be carried by the operator for delivering drinks to his customers, the quantity of liquid for each cup being always the same for every stroke of the plunger.

It is understood that our apparatus may be modified without departing from the spirit of our invention as set forth in the appended claims.

We claim as our invention:

1. A beverage dispensing apparatus comprising a vessel for a liquid, a cylindrical container in the vessel, a plunger slidably fitted in the container, a gravity intake valve at the bottom of the container, a spring valve at the under side of the plunger adapted to supplement the action of the bottom valve, a pipe extending from the container to a point above the vessel for discharging the liquid, a check valve in the pipe for preventing the return flow of the liquid, means to manually move the plunger downward for delivering the contents of the container through the pipe, and a yieldable means to retrieve the plunger thereby drawing a charge of the liquid into the container.

2. A beverage dispensing apparatus comprising a vessel for a liquid, a cylindrical container in the vessel, a plunger slidably fitted in the container, a cover closing the lower end of the container, means to removably retain the cover on the container, the cover having an aperture, a disc valve closing the aperture, the plunger having an opening, a spring valve closing the opening from underneath, an intake valve in the container, a pipe extending from the container to a point above the vessel for discharging the liquid, a check valve in the pipe for preventing the return flow of the liquid, means to manually move the plunger downward for delivering the contents of the container through the pipe, and a yieldable means to retrieve the plunger thereby drawing a charge of the liquid into the container.

3. A beverage dispensing apparatus comprising a vessel for a liquid, a cylindrical container in the vessel open at both ends, a cap-shaped cover for the lower end of the cap, the sides of the cap having slots for retaining the cover in its position, the cover having an aperture and a valve yieldably closing the aperture, a plunger slidably fitted in the container, an intake valve in the bottom of the container, the container being opened at the top, a pipe extending from the bottom of the container to a point above the vessel, a check valve in the pipe for preventing return flow of the liquid from the pipe into the container, means to manually move the plunger into the container for delivering a measured quantity of the liquid through the pipe, and means to move the plunger upward thereby drawing a charge of the liquid into the container.

4. A beverage dispensing apparatus comprising a vessel for a liquid, a cover removably fitted on the vessel, a container, supporting members for the container depending from the cover, an intake valve at the bottom of the container, a plunger in the container, a plunger rod slidably fitted in the cover, the container being open at the top, a pipe extending from the bottom of the container through the cover, a cap on the cover, a shaft rotatively supported in the sides of the cap, a handle on the outer end of the arm adapted to be manually operated for rotating the shaft, a link pivotally connected to the arm at one end and to the rod at the other end for moving the rod with the plunger downward thereby discharging a measured quantity of the liquid through the pipe, a retrieving means for raising the plunger thereby drawing the liquid into the container, and means to removably support the vessel on the shoulders of an operator.

WM. W. CANNON.
JULIUS HURWITZ.